US011111443B2

(12) United States Patent
Medellin Rivera et al.

(10) Patent No.: US 11,111,443 B2
(45) Date of Patent: Sep. 7, 2021

(54) PROCESS AND ZEOLITIC CATALYST FOR THE CATALYTIC CRACKING OF UNCONVENTIONAL LIGHT CRUDE OIL TYPE SHALE/TIGHT OIL AND ITS BLENDS WITH VACUUM GAS OIL

(71) Applicant: INSTITUTO MEXICANO DEL PETROLEO, Mexico City (MX)

(72) Inventors: Blanca Lucia Medellin Rivera, Mexico City (MX); Maria del Rosario Socorro Luna Ramirez, Mexico City (MX); Edith Meneses Ruiz, Mexico City (MX); Rogelio Hernandez Suarez, Mexico City (MX); Agapito Alberto Neri Gomez, Mexico City (MX); Guadalupe Hayde Moreno Vasquez, Mexico City (MX); Gonzalo Hernandez Tapia, Mexico City (MX); Roberto Garcia De Leon, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 18 days.

(21) Appl. No.: 16/109,360

(22) Filed: Aug. 22, 2018

(65) Prior Publication Data
US 2019/0062641 A1    Feb. 28, 2019

(30) Foreign Application Priority Data
Aug. 23, 2017 (MX) .................... MX/a/2017/010802

(51) Int. Cl.
| C10G 11/05 | (2006.01) |
| B01J 29/88 | (2006.01) |
| B01J 29/80 | (2006.01) |
| B01J 29/40 | (2006.01) |
| B01J 29/08 | (2006.01) |
| B01J 35/10 | (2006.01) |
| B01J 35/02 | (2006.01) |
| B01J 35/00 | (2006.01) |

(52) U.S. Cl.
CPC ............ *C10G 11/05* (2013.01); *B01J 29/084* (2013.01); *B01J 29/088* (2013.01); *B01J 29/40* (2013.01); *B01J 29/405* (2013.01); *B01J 29/80* (2013.01); *B01J 35/002* (2013.01); *B01J 35/023* (2013.01); *B01J 35/1019* (2013.01); *B01J 35/1038* (2013.01); *B01J 2229/20* (2013.01); *B01J 2229/36* (2013.01); *B01J 2523/3706* (2013.01); *B01J 2523/3712* (2013.01); *C10G 2300/1059* (2013.01); *C10G 2300/1074* (2013.01); *C10G 2300/4006* (2013.01)

(58) Field of Classification Search
None
See application file for complete search history.

(56) References Cited

U.S. PATENT DOCUMENTS

| 4,521,297 A | 6/1985 | Angevine et al. |
| 4,588,702 A | 5/1986 | Beck et al. |
| 2003/0136707 A1* | 7/2003 | Harris ................ B01J 35/0026 208/120.01 |
| 2011/0224067 A1 | 9/2011 | Wormsbecher et al. |
| 2012/0088654 A1 | 4/2012 | Wang et al. |
| 2016/0216242 A1* | 7/2016 | Ravichandran .......... B01J 29/40 |

FOREIGN PATENT DOCUMENTS

| CA | 2635521 | 12/2008 |
| MX | 245842 | 9/2007 |
| WO | 2007082629 | 7/2007 |
| WO | 2010068255 | 6/2010 |

* cited by examiner

*Primary Examiner* — Tam M Nguyen
(74) *Attorney, Agent, or Firm* — Jason P. Mueller; FisherBroyles, LLP

(57) ABSTRACT

The present invention deals with a process for catalytic cracking of hydrocarbons comprising vacuum gas oil, hydrotreated vacuum gas oil, unconventional light crude oil, preferably unconventional light crude oil type shale/tight oil and its blends with conventional vacuum gas oil, in order to generate products of major commercial value in the field of fuels, getting improved gasoline and coke yield, as well as the procedure for the preparation of a catalyst with essential physical properties of density and particle size to uphold it in a fluidized bed under the operation conditions in the catalyst evaluation unit at micro level, wherein the catalyst particles achieve a catalytic performance similar to fluidized microspheres in a reactor, without appreciable generation of fine particles.

7 Claims, 6 Drawing Sheets

PROCESS AND ZEOLITIC CATALYST FOR THE CATALYTIC CRACKING OF UNCONVENTIONAL LIGHT CRUDE OIL TYPE SHALE/TIGHT OIL AND ITS BLENDS WITH VACUUM GAS OIL

CROSS-REFERENCE TO RELATED APPLICATIONS

The present application claims priority to Mexican Patent Application No. MX/a/2017/010802, filed Aug. 23, 2017, currently pending.

TECHNICAL FIELD OF THE INVENTION

The current invention deals with a process and the application of heterogeneous solid acid catalysts to obtain products of major commercial value in the field of fuels, by means of catalytic cracking of vacuum gas oil, hydrotreated vacuum gas oil, unconventional light crude oil type shale/tight oil and its blends with gas oil as feedstocks, getting improved gasoline and coke yields.

Such catalysts are preferably composed of a zeolite and an alumina base matrix. The process for obtaining them is from a matrix, selected of a group consisting of alumina, silica, silica-alumina, kaolin, colloidal silica and its mixtures. The preparation method and the properties focused to cracking reactions using preferably paraffinic unconventional light crude oil type shale/tight oil feedstocks and its blends with vacuum gas oil. Its use is as a promoter in cracking reactions to improve the selectivity to obtain gasoline, LPG and catalytic coke.

BACKGROUND OF THE INVENTION

The present invention refers to the preparation method and to the catalytic performance evaluation of heterogeneous acid catalysts, which have the advantage of preferably producing gasoline and coke, by catalytic cracking in a fluidized bed (FCC) of long chain hydrocarbons ($C_{40}$-$C_{45}$) in heterogeneous phase. Vacuum gas oil, hydrotreated vacuum gas oil, and unconventional light crude oil type shale/tight oil and their blends with vacuum gas oil were used as feedstock for this FCC process.

Fluid Catalytic Cracking Process

The fluid catalytic cracking process (FCC) is an important petroleum refining process because of its capability to convert the low valuable heavy petroleum fractions into products of high commercial and strategic value such as gasoline, butanes-butenes and liquefied petroleum gas (LPG).

Currently, this process provides more than 40 volume % of gasoline produced in the national system of refining in Mexico (NSR). The heavy fractions of hydrocarbons are converted into lighter products, through reactions that are carried out in the presence of a catalyst at high temperature, so they occur in the gas phase.

Feedstocks that are subjected to the FCC process are generally those refinery streams of high boiling point from vacuum distillation such as heavy vacuum gas oil and atmospheric distillation gas oils called atmospheric residues and hydrotreated feedstocks or blends of such streams. When these feedstocks are put in contact with fluidized bed catalyst particles, at temperatures ranging from 427 to 593° C., they are converted to hydrocarbon streams with lower boiling point and high commercial value.

In recent years, the commercial exploitation of unconventional light crude oils (shale/tight oil) has reached a significant scale, particularly in the United States of America (USA), while in Mexico it is an alternative that is being considered due to the existing reserves of this type of crude that put the country in an eighth place worldwide. Now days, this type of unconventional crude oils have combined to the crude feedstocks that are processed in refineries of USA.

An alternative for processing this type of extra light crudes oils, is to process them together with the conventional feedstock in FCC units, so introduction of tight/shale oil in refineries will produce major changes in operation of FCC units, in the operation conditions and in the catalysts. All of them must be optimized to maximize the value of the process and to improve the yield of valuable products.

The properties of unconventional light crude oil type shale/tight oil change drastically in its composition and its distribution of the number of carbon atoms as compared to other types of crude oils, in spite of, they improve the properties in blends with heavy feeds. However, the great content of alkali metals in such unconventional oils, such as Ca and Na, in addition to Fe, deactivates and negatively affects yields and catalytic performance of conventional FCC catalysts. In addition, coke yield drastically reduces so the thermal balance of the FCC Units is affected and possibly, there is octane loss in the catalytic gasoline.

Although the use of hydrotreated feedstocks or light crude oil type shale/tight oil have great benefits, such as the substantial increase in gasoline yield, its use is also associated to problems in the stable operation of a FCC unit. In particular, the thermal balance in which the FCC units operate is affected because the hydrotreated feedstocks or the shale/tight oil composition (predominantly paraffins and naphthenes) contain relatively low coke (aromatic) precursors so, there is loss in the catalytic gasoline octane. Additionally, Shale/tight Oil can have a significant increase in alkali metals content, such as Ca, Na. Ba, Fe, K, Ni, V, Mg, which deactivate and affect the FCC catalysts performance.

The FCC process has been used for more than 60 years; however, improved techniques are continuously researched and incorporated to optimize the catalytic cracking process, in order to maximize the yield of higher commercial value products. Although FCC technology is considered a mature technology, there are still niches of improvement in process and catalysts development.

Another goal of the FCC unit process is to increase the barrel-octane, which means to increase the yield of high-octane gasoline. The octane number is affected by the $H_2$ transfer reactions, so modifications in the composition of the catalysts, control of the unit cell size of the zeolite and introduction of additives are made to direct the selectivity of catalysts towards the production of gasolines or towards the production of olefins.

In the FCC process, the feedstock is fed into the lower section of the riser in the FCC reactor, wherein the large hydrocarbon chains of feedstock are vaporized and disintegrated to lighter products or small hydrocarbon chains. The feedstock is put in contact with the hot catalyst that circulates from de regenerator to the riser. Reactions that take place in catalytic cracking are endothermic. Certain amount of coke is deposited on the catalyst surface causing a temporary deactivation; the catalyst activity is reduced, so it has to be regenerated at high temperatures in air atmosphere.

The FCC process comprises three main stages (a) disintegration reaction, where the feedstock is converted into light products, (b) exhausting of the hydrocarbons adsorbed on the catalyst and (c) regeneration, by burning the coke deposited on the catalyst, the regenerated catalyst is reused.

Fluid Catalytic Cracking Catalysts

The great advance in FCC catalysts development occurred in the 60's, with the introduction of molecular sieves or zeolites, these materials were incorporated into a matrix composed of amorphous materials or mixtures of amorphous material-kaolin; these materials constituted the FCC catalysts in those years. Zeolitic catalysts revolutionized the FCC process due to its properties and to its selectivity into products.

The FCC catalysts are in micro spherical particles form, with average particle sizes of 50 to 100 microns. They are made of several components, with each component designed to promote the catalytic behavior and fulfill a specific function. Some of them promote activity and selectivity while others improve the mechanical integrity and maintain the physical properties of the catalyst particles. The FCC catalysts are generally composed of a zeolite, an active matrix, a clay and a binder, incorporated into particles or as mixtures of individual particles with different functions. The zeolite is responsible for the hydrocarbons cracking reactions and for the selectivity shape. There are several zeolites available for this purpose such as Y-zeolite, X-zeolite and Beta-zeolite, which have large pore sizes for the processing of heavy crudes, which have molecules difficult to break into light products. Mesoporous zeolites are currently used to improve the accessibility of molecules.

Rare earth metals are widely used as components of FCC catalysts. They are used to promote the activity, the hydrothermal stability of the zeolites and to increase the gasoline yield therefore. The need to increase the gasoline yield and to process heavy crudes with high metals content, has led over time, to increase the rare earths metals content in the FCC catalysts formulation. The typical contents of rare earths in the FCC catalysts ranges from 0.5 to 6.0% by weight of the formulation. The most used catalysts include REY-zeolite, USY and rare earth zeolites known as REUSY in their formulations.

A substantial increase in the content of Ca, Na, Fe in Shale/tight Oil would drastically affect the activity of the catalysts by a deactivation process.

In relation to the above, references selected within the state of the art are provided below, which does not report any information about the catalytic activity for the disintegration of unconventional shale/tight crude oil and its blends with gas oils in the FCC process:

U.S. Pat. No. 4,521,297 describes a process for the conversion of shale oil fractions using a catalyst based on a ZSM-12 zeolite, with different $SiO_2$—$Al_2O_3$ molar ratio in the inner core and the outer structure. The process consists in the selective conversion of a feedstock comprising crude shale oil or the heavy fraction of the shale oil, especially the 454° C.+fraction to a 50-90% by weight of an oil product fraction with boiling points of 204-343° C. boiling range. This feedstock is put in contact with a crystalline ZSM-12 zeolite, at operating conditions of temperature of 343-440° C., a pressure of 500-3000 psig, $H_2$/hydrocarbon ratio of 1000-10,000 ft$^3$/B and an LHSV of 0.2-2 H$^{-1}$.

The extra-light crude oil used contains a high concentration of paraffins and naphthenes, which makes it useful to produce diesel and jet fuel, but undesirable to produce gasoline. ZSM-12 Zeolite exhibits high selectivity, due to its low restriction index and converts the 343° C.+fraction (heavy fraction) of the extra light crude oil type shale/tight oil, to a lighter fraction, with low yield of undesirable light fractions. The less reactive shale oil fraction and the most difficult to convert into gasoline and diesel, is the 454° C.+fraction, because it is diffusionally restricted to be catalyzed, but it can be converted into a lighter cut by reacting it with hydrogen on a ZSM-12 zeolite as described in this patent.

U.S. Pat. No. 4,588,702 protects the preparation of a catalyst for the conversion of hydrocarbons. This catalyst generates low coke content and high octane, has high activity and selectivity, is thermally stable and generates low production of catalytic residue. The catalyst is a combination of 8-25 weight % of ultra-stable Y-zeolite (HY) which has a silica/alumina mol ratio of 5 and unit cell size of 24.3 to 24.7 angstroms. The catalyst also has from 20 to 70 weight % of clay or kaolin with crystal size of 0.2 to 2 microns; from 35 to 70 weight % matrix in co-gelation with silica-alumina; at least 13 weight % of $Al_2O_3$; from 0.1 to 3 weight % of rare earths like lanthanum and cerium and at least 10 weight % of ZSM-5 zeolite to partially crack the paraffins of the feedstock. The catalyst properties indicate a pore volume greater than 0.4 cm$^3$/g, 40 to 70% of the pores have a pore diameter from 100 to 1000 Å and less than 35% of all pores are from 20 to 100 Å, measured by mercury porosimetry. The catalyst of the invention shows exceptionally good catalytic performance at severe operating conditions with low quality residual feedstocks (heavy feedstocks).

WO Pat. No. 2007/082629 A1 describes the composition of a basic FCC catalyst prepared from basic materials, which may be an anionic clay such as hydrotalcite; in this material, the brucite-like main layer is formed of octahedrons alternating with interlayers in which the water molecules and carbonate-type anions distributes. In this invention, a (true) hydrotalcite is used and is so called because it possesses Mg as a divalent metal and alumina as a trivalent metal. Another preferred basic material is aluminum phosphate to which the acid character is modified by adding a doping agent: La, W, Zn, Zr and their mixtures.

The catalyst has a high surface area to compensate for its lower activity as compared to a conventional FCC catalyst: BET area >60 m$^2$/g and at least 90 m$^2$/g after being deactivated with steam at 788° C. for 5 hours.

The resulting catalyst was evaluated in the FCC process using feedstocks selected from the group: vacuum gas oil, hydrotreated vacuum gas oil, atmospheric resid, shale oil, bituminous sand and blends thereof. CA Pat. No. 2635521 protects a catalytic formulation containing 10 to 60% by weight of a solid acid, from 0 to 50% by weight of alumina, from 0 to 40% by weight of silica, and the remaining amount of kaolin. The solid acid compound can be a ZSM-5 type zeolite, a faujasite-type zeolite, mordenite-type zeolite, silico-alumino-phosphate (SAPO) or aluminum phosphate (ALPO).

The catalyst was evaluated in catalytic disintegration reactions for diesel production from oil plants seeds, under conventional conditions, suitable for the processing of heavy gas oils or residues at temperature higher than 490° C.; at least one of the reactors processes vegetable feedstocks coming from oleaginous plants seeds at a temperature lower than 490° C.

WO Pat. No. 2010/068255 A1 describes the catalytic cracking of a feedstock comprising at least one hydrocarbon fraction and at least one bio renewable feed, with a catalytic cracking catalyst under FCC fluidized bed catalytic cracking conditions. The hydrocarbon fraction is a feed selected from the group of deep-cut gas oil, vacuum gas oil (VGO), thermal oil, residual oil, crude oil, bituminous sands, shale-oil light crude oil and synthetic oil. The application describes the use of blends of vegetable oils, such as palm oil, soybean oil or rapeseed oil, with heavy gas oils and residues. The patent does not describe the composition and neither the method for the preparation of a catalyst for the FCC process, since the use of commercial catalysts is mentioned. The catalyst may contain a Faujasite-Y zeolite, a matrix, and at least one rare earth metal oxide in 1.5 to 5% by weight of the catalyst; the rare earth metal oxide is selected from the group consisting of Lanthanum, Cerium and mixtures thereof, the matrix is selected from the group consisting of Silica, Alumina, Silica-alumina and mixtures thereof, which in turn it comprises a binder which is selected from the group of alumina consisting of an alumina peptized with acid, an alumina peptized with a base, aluminum chlorohydrate and mixtures thereof.

In U.S. Publ. No. 2011/0224067 A1, the modification of a USY zeolite to generate a textured zeolite is described. Such modification was carried out starting from a sodium zeolite; after, it was exchanged with ammonium sulfate in an autoclave. Rare earths were added during the integration of the catalyst. The preparation of FCC catalysts is described by mixing a slurry containing of 38-39% by weight of the zeolite, 16% by weight of alumina (of hydrochloride), 10% by weight of alumina (of boehmite), 2-5.9% by weight of rare earths oxides and a clay; followed by spraying drying and calcination. In the textured zeolite catalysts, the alumina content in the matrix is 26% by weight, while in the catalysts of this invention is 15% by weight. Among the feedstocks that can be treated with textured zeolite catalysts are those with a high content of metals, including vacuum gas oil, coker gas oil, residuals, synthetic oil, heavy fractions. In this patent the application is focused to loads with a high content of polluting metals, without considering the application of light shale oil.

U.S. Publ. No. 2012/0088654 A1 refers to the composition and preparation of mesoporous aluminas modified with phosphorus, rare earths (La, Ce, Nd, Y, Pr) and MTAB as templating agent and as mesoporous generating effect. Thus, prepared mesoporous aluminas are used as a matrix in FCC catalysts or as supports for catalysts, preferably in combination with other materials such as USY zeolites and inert compounds. The formulation has a high surface area and excellent thermal and hydrothermal stability, with a relatively close pore size distribution in the mesoporous range, with an average pore diameter of 45 to 200 Angstroms, and mono modal pore distribution curve. It is mentioned that the catalyst of this invention can be used in the catalytic cracking of a wide range of feedstocks, including light, medium or heavy gas oil, with an initial boiling point over 204° C. and final boiling point in 315° C., vacuum gas oils, thermal oils, residual oil, recycled materials, tar sand oils, light crude shale oil, synthetic fuels, heavy hydrocarbon fractions coming from the destructive hydrogenation of coal, tar, asphalts, hydrotreated feedstocks derived from any of the above, and similar. Residual or vacuum gas oils with high metal contents can also be disintegrated using catalysts based on mesoporous oxides. The catalyst of this invention was catalytically evaluated to disintegrate a vacuum gas oil but shale oil type feedstocks were not used.

DETAILED DESCRIPTION OF THE INVENTION

The catalysts of this invention were prepared by the component integration method using a synthetic Faujasite Y zeolite, an active matrix which may be composed of gamma-alumina, silica-alumina or silicon oxide and kaolin.

A Faujasite Y zeolite can be used as an active phase in its acid (Y) or in its ultrastabilized (USY) form. The Faujasite Y zeolite may or may not be interchanged with rare earths such as Lanthanum (La), Cerium (Ce) and Yttrium (Y), or a mixture thereof. In this invention, the use of rare earths oxides improved the performance of the FCC catalyst. The rare earth oxide content in the zeolites (REY or REUSY zeolite) is from 7 to 12% by weight of rare earth oxides, preferably between 7 and 9% by weight suitable for the catalytic cracking of hydrotreated vacuum gas oils and different blends of gas oils, heavy vacuum gas oil or conventional vacuum gas oil with shale/tight oil with high selectivity to gasoline and adequate selectivity to coke. The method of preparation of the Faujasite Y zeolite is known in the art and is not part of this invention. The REY or REUSY zeolite used in this invention has a surface area greater than 650 m$^2$/g. The content of sodium oxide in the REY or REUSY zeolites must be less than 1% by weight and the SiO$_2$/Al$_2$O$_3$ mol/mol ratio is between 4 and 9, preferably between 4 and 6. The zeolite content in the FCC catalyst of this invention comprises values between 20 and 60% by weight of REY or REUSY zeolite, preferably between 25 and 40% by weight.

The REY or REUSY zeolite is incorporated into an active matrix, the matrix or binder can be composed of synthetic or natural materials, among which are the gamma-alumina, silica-alumina and silicon oxide.

The boehmite, precursor of the alumina (in gamma phase) used in this invention, has thermal and structural stability in the range of 450° C. to 650° C., and can be used as matrix or as support in catalysts. In this temperature range, the transition of the boehmite (or pseudo boehmite) phase into alumina in the gamma phase occurs; this is known in the state of the art and can be confirmed by thermal analysis and X-ray diffraction. The alumina (in gamma phase) used for the synthesis of the catalysts of this invention, is characterized by its textural properties, the gamma-alumina may have a surface area from 180 to 300 m$^2$/g, preferably between 200 and 250 m$^2$/g, a pore volume of at least 0.40 cm$^3$/g and a pore diameter between 40 and 90 Å. The process for obtaining the boehmite used in the catalysts described herein, and that after calcining have the defined texture properties, is described in the Mexican patent MX No. 245842. The bohemite obtained with the procedure of the Mexican patent MX No. 245842 and which provides greater activity and selectivity toward catalytic cracking reactions to the FCC catalyst of this invention, exhibits a monomodal pore size distribution, pore diameter preferably between 40 and 90 Å; as well as Brönsted-type acidity and Lewis-type acidity. The crystalline phase is maintained even after being calcined at the reference temperature.

In the same way the transition from boehmite (or pseudo boehmite) to gamma-alumina proceeds, the aluminum chlorohydrate is also transformed into gamma-alumina.

The alumina content in the FCC catalyst of this invention is between 10 and 30% by weight, preferably between 10 and 25% by weight and can be made from boehmite or from mixtures of boehmite and aluminum hydrochloride.

The binding character of the matrix of this invention was achieved by forming a boehmite gel with an organic or inorganic acid and distilled water. Formic acid and acetic acid are within the most used organic acids. The inorganic acid used is preferably nitric acid. The acid solution preferably used in this invention is of organic character and was prepared with 10% by weight and 90% by weight of distilled water. A known acid volume was added to the boehmite, and a gel with 30% solids was formed.

The catalyst contains from 10 to 12% by weight of silicon oxide, 0.5 to 10% by weight of pentasil ZSM-5 zeolite as an additive, in addition to kaolin.

The preparation of the catalyst named CAT-1, described in this invention, enabled to obtain suitable properties for its application in catalytic cracking of gas oils, vacuum gas oil, hydrotreated gas oil, unconventional light crude oil type shale/tight oil and blends thereof. The preparation of the catalyst comprises the following procedure:

In a vessel, REY (or REUSY), ZSM-5 zeolite and distilled water were added, 30% by weight of solids were considered.

Disperse the zeolites in water from 15 to 60 minutes at a speed of 1000 to 5000 rpm in order to have a complete dispersion.

Add colloidal silica and kaolin while maintaining 30% by weight of solids in the suspension.

Disperse from 5 to 60 minutes, at a speed of 1000 to 5000 rpm, until complete dispersion is achieved.

A catalyst named CAT-2 is produced by adding aluminum hydrochloride in solution after adding the boehmite gel, following the same preparation protocol.

The final dispersion mixture is oven dried between 80 and 200° C. for 4 to 12 hours to obtain the paste with an adequate solids content. The resulting paste is processed in a stainless steel hand extruder to form extrudates, which are left at room temperature overnight, then dried between 100 and 120° C. for 4-8 hours and calcined at 600° C. during 3 or 8 hours.

In order to achieve the essential catalyst size that let them to be fluidized in a suspended and confined bed, that is, to flow by means of upstream and downstream nitrogen flow inside the reactor, and to maintain an adequate operation in the evaluation unit, the extrudates obtained were grinded (crushed) then sieved to the corresponding sizes of +60/−200 mesh sieve.

The catalysts CAT-1 and CAT-2 of this invention were hydrothermally deactivated to simulate the properties of an Equilibrium Catalyst. Each catalyst was subjected to hydrothermal treatment in a quartz reactor. The treatment is started at a heating rate of 3 to 5° C./min, starting at room temperature until reaching the value of 816-900° C., preferably at 816° C., with a nitrogen flow of 100 mL/min, next the nitrogen flow is changed by steam and kept at the same temperature for 5 hours. Finally, the temperature is let down by a nitrogen current. The procedure described is carried out for a suitable operation of the activity and selectivity evaluation in the activity evaluation unit. The catalysts hydrothermally treated at 816-900° C., showed total specific area in the range of 210 to 260 $m^2/g$ when boehmite was used in the matrix, and from 200 to 240 $m^2/g$ when boehmite was combined with aluminum hydrochloride. The micropore area (or zeolite area) was from 160 to 210 $m^2/g$ when considering 38% by weight of USY or REY zeolite, and from 160 to 190 $m^2/g$ when considering 35% by weight of USY zeolite or REY. The matrix area determined after the hydrothermal treatment, is in the range of 50 to 60 $m^2/g$. The exhibited pore volume was 0.21 to 0.24 $cm^3/g$.

The CAT-2 catalyst was further treated hydrothermally under extreme conditions (860-900° C.), preferably at 860° C., following the deactivation protocol described above. The catalyst had a total specific area of 175 $m^2/g$, a micropore or zeolite area of 122 $m^2/g$ and a matrix surface area of 53 $m^2/g$, the pore volume was 0.22 $cm^3/g$.

The catalysts of this invention were obtained with irregular shape. However, when treated with the described method, the essential physical properties of density and particle size required to maintain it in a suspended and confined bed at operating conditions in the evaluation unit, were achieved. It was observed that the catalyst particles presented a performance similar to microspheres, without generation of fine particles.

The evaluation of the catalysts of this invention, previously deactivated according to the described procedure, was by means of a processing unit called ACE-R™ at microreaction scale, which is equipped with instrumentation and devices suitable to operate in similar pressure and temperature conditions of an industrial plant. The microreaction unit has a data acquisition system, supervision and automated control system that were disposed for the automation of the fluidized catalytic cracking process unit. The objective of the unit is the evaluation of catalysts applied to the catalytic cracking reaction of vacuum gas oils, unconventional light crude oils type shale/tight oil and their blends.

The catalysts previously described are subjected to hydrothermal deactivation, and they are evaluated experimentally in activity tests in the catalytic cracking reaction with vacuum gas oil (cutting of hydrocarbons with a boiling temperature of 222 to 563° C.), and unconventional light crude oil type shale/tight oil, (boiling temperature in the range of 43 to 704° C.) and blends of them. The experimental evaluation unit ACE-R™ is composed mainly of four sections: 1.—Feeding section, in this section the gas oils are received and transferred for reaction, consists of a container and of an injection pump type syringe. 2. The catalytic cracking reaction section consists of a batch bed reactor and mainly of devices necessary for temperature control. 3. Separation section, which involves the sampling and characterization of the reaction products. In this section, the main products are separated into liquid phase products (gasoline, light cyclic oil (LCO) and heavy cyclic oil (HCO)), gas phase products (LP gas, hydrogen, ethane, ethylene and $CO_2$) and the composition of the species present in the reaction products are characterized. 4. Catalyst regeneration section, where the coke deposited on the catalyst surface during the reaction is removed by a combustion process The evaluation of heterogeneous catalysts was carried out by ebullient bed catalytic cracking reactions using conventional vacuum gas oils, hydrotreated vacuum gas oils, unconventional light crude shale/tight oil and its blends with vacuum gas oils. The catalysts were evaluated using vacuum gas oils and blends of vacuum gas oil with 10, 30, 50 and 100% by volume of shale/tight oil. The API density of the feed stream increased (from 23 to 29° API) and the other properties were improved when the blend has at least 30% by volume of shale/tight oil. The expected effect by using blends as feedstocks, is to increase the cracking degree or vacuum gas oil conversion, to increase the selectivity to gasoline and the selectivity to other valuable products, maintaining the coke yield in the catalyst. The tested blends show a slight increase in the sodium content (Na), because the domestic shale/tight oil used has a higher concentration of this metal (2.9 ppm in sodium).

The process for catalyst evaluation in the microreaction plant is through the following steps:

Catalyst drying: The catalyst is dried in a suitable equipment for this activity for a period of one to two hours, preferably one hour. The drying temperature of the catalyst comprises 100 to 200° C., preferably 120° C.

The particle size of the catalyst that is fed into the reactor is between 40 to 250 microns, preferably 60 to 200 microns.

The catalyst required for the activity evaluation is weighted before be fed into the reactor. The catalyst mass considered is from 6 to 9 grams, preferably 9 grams.

The activity evaluation of the heterogeneous catalyst was carried out for a catalyst/oil ratio from 3 to 10, preferably for 4.5, 6, 7.5 and 10, by varying the injection time of the feed.

The catalytic reaction was carried out in a suspended and confined bed reactor for the cracking of the feed fed at a temperature of 480 to 530° C., preferably of 520° C. The catalytic evaluation was carried out in an isothermal type tubular reactor with suspended and confined bed.

The reactor has a cylindrical geometry in stainless steel, SS 316. The design favors fluidization of the catalyst.

The temperature in the tubular reactor is maintained by an automatic control under isothermal conditions.

Throughout the experimental procedure, the mass of the feed stream can vary in the range of 0 to 3 g/min, keeping the feed flow constant preferably at 1.2 g/min.

The time used to introduce the mass of vacuum gas oil, unconventional crude oil shale/tight oil and/or their blends to the reactor, comprises time of 10 to 150 seconds, preferably 100, 75, 60 and 45 seconds.

The injection time of the vacuum gasoil mass, unconventional crude shale/tight oil and/or its blends to the reactor, is a function of the position (height of the plunger of the injector), the gasoil is conveyed by nitrogen flow.

The injection time for the gasoil feed is previously standardized, by generating the calibration curve of the injection pump. The fluidization of the catalyst and keeping it in equilibrium is achieved by the injection of nitrogen flows in the lower and upper section of the reactor.

The mass balance of the cracking products is made based on the mass of the recovered gas product and liquid product besides coke mass deposited in the catalyst.

The removal of the coke deposited on the surface and pores of the catalyst is carried out by burning the coke in the regeneration system, at a temperature of 650 to 700° C., preferably of 695° C.

The mass of the coke (carbon) deposited on the surface of the catalyst was quantified indirectly, by means of a $CO_2$ analyzer coupled in line, and calibrated for $CO_2$ concentrations from 0 to 25% by weight.

The liquid reaction product was recovered in collectors that are part of the experimental system, where it is separated from the gas to be characterized by chromatography analysis, via simulated distillation (SIMDIST), in a capillary column of fused silica SEPSYS suitable for ASTM-D-2887 method, and flame ionization detector (FID)/Chemiluminescence for sulfur (SCD).

The temperature of the product collection cooling liquid is from −10 to −15° C., preferably −10° C. The cooling liquid consists of 50% weight of ethylene glycol and 50% weight of distilled water.

The gas product recovered in the collectors that are part of the experimental system was characterized by coupled refinery gas chromatography, in a capillary column of fused silica SEPSYS GR-CAPIL of 0.32 mm ID×50 meters in length and 5 microns of thickness; flame ionization detector (FID) and thermal conductivity detector (TCD). The reaction products analysis quantifies the obtained compounds, so it is possible to generate base information to calculate the mass balance and to evaluate the performance of the catalysts of the present invention.

In this way, the yield of the most important products of the catalytic cracking process is obtained. The products include: dry gas, LP gas (initial boiling temperature IBP up to 35° C.), gasoline (boiling temperature from 35° C. to 221° C.), light cyclic oil, LCO, (boiling temperature from 221° C. to 343° C.), heavy cyclic oil, HCO, (boiling temperature from 343° C. until final boiling temperature FBT), and coke to make the mass balance.

At the end of the evaluation procedure, the catalyst is discharged from the reactor when the sequence of evaluations at different levels of catalyst/oil ratio has been completed.

The FCC catalysts are designed for the transformation of high molecular weight hydrocarbons into light fractions, generally with the presence of metallic components (Ni and V) in the feed stream to the catalytic cracking reactor. The catalysts to be used in FCC units for cracking vacuum gas oil and blends with light crude oil type shale/tight oil, also have the challenge to tolerate the alkaline metals content (such as sodium and/or calcium), above the typical content found in conventional vacuum gas oil. The physical and chemical properties of light crude oils are shown in Table 1. Even more, another challenge associated to the transformation of light crude shale/tight oils in an FCC Unit is to maintain the typical coke yield due to its impact in the unit energy balance. Table 1 shows the properties of a conventional vacuum gas oil from a refinery, a light crude oil type domestic shale oil (with light compounds), and its blends. The mentioned hydrocarbon blends were used as reactor feedstocks to evaluate the activity of the catalysts of the present invention.

TABLE 1

Properties of vacuum gas oil (VGO), light crude oil type shale/tight oil (with light hydrocarbons) and its blends used as feedstocks in the examples of the present invention.

| Physical Properties | Method | Feedstock 1 VGO 100% by Volumen | Feedstock 2 Blend 90 VGO + 10 Shale Oil, % by volume | Feedstock 3 Blend 70 VGO + 30 Shale Oil, % by volume | Feedstock 4 Blend 50 VGO + 50 Shale Oil, % by volume | Feedstock 5 Shale/ tight Oil [1] 100% by volume |
|---|---|---|---|---|---|---|
| Specific weight$^{20/4° C.}$ | ASTM D70-09e1 | 0.9179 | 0.8942 | 0.8850 | 0.877 | 0.8304 |
| ° API | ASTM D287-12B | 23.2 | 26.7 | 28.3 | 29.8 | 38.90 |
| Kuop factor (calculated) | | 11.83 | 12.09 | 12.12 | 12.13 | 12.4 |
| Viscosity @ 98.9° C., SSU | ASTM D88-07(2013) | 48.56 | 47.5 | 42.8 | 38 | 37.8 |

TABLE 1-continued

Properties of vacuum gas oil (VGO), light crude oil type shale/tight oil (with light hydrocarbons) and its blends used as feedstocks in the examples of the present invention.

| Physical Properties | Method | Feedstock 1 VGO 100% by Volumen | Feedstock 2 Blend 90 VGO + 10 Shale Oil, % by volume | Feedstock 3 Blend 70 VGO + 30 Shale Oil, % by volume | Feedstock 4 Blend 50 VGO + 50 Shale Oil, % by volume | Feedstock 5 Shale/ tight Oil [1] 100% by volume |
|---|---|---|---|---|---|---|
| Distillation, °C. | ASTM | ASTM D-1160 | ASTM D-2887 | ASTM D-2887 | ASTM D-2887 | ASTM D2887 |
| IBP | | 222.1 | 135 | 83 | 83 | 43.4 |
| 5% by vol. | | 327.0 | 275 | 197 | 156 | 104.2 |
| 10% by vol. | | 359.2 | 327 | 264 | 207 | 152 |
| 30% by vol. | | 413.2 | 394 | 378 | 348 | 247.4 |
| 50% by vol. | | 447.8 | 432 | 424 | 412 | 337.6 |
| 70% by vol. | | 480.5 | 471 | 468 | 464 | 435.8 |
| 90% by vol. | | 525.4 | 522 | 529 | 538 | 570.4 |
| 95% by vol. | | 545.7 | 547 | 564 | 585 | 623.0 |
| FBP | | 563.4 | 658 | 689 | 696 | 704.4 |
| Ramsbottom coal, % by weight | ASTM D524-10 | 0.14 | 0.264 | 0.501 | 0.745 | 1.37 |
| Chemical properties | | | | | | |
| Refractive index | ASTM D1218-07 | 1.5133 | — | — | — | 1.4780 |
| Total nitrogen, ppm | ASTM D4629-08 | 1,061 | 992 | 860 | 723 | 376 |
| Basic nitrogen, ppm | UOP-269-10 | 315 | 291 | 245 | 197 | 77 |
| Sulfur, % by weight | ASTM D 4294-98 | 2.292 | 2.17 | 1.9 | 1.7 | 1.114 |
| Fe, ppm | 05LA-34090309-EAA-004 | 1.65 | 1.52 | 1.28 | 1.03 | 0.41 |
| Ni, ppm | 05LA-34090309-EAA-004 | 2.02 | 1.82 | 1.44 | 1.06 | 0.07 |
| Cu, ppm | 05LA-34090309-EAA-004 | 0.24 | 0.21 | 0.17 | 0.13 | 0.02 |
| V, ppm | 05LA-34090309-EAA-004 | 5.32 | 4.81 | 3.83 | 2.82 | <0.25 |
| Na, ppm | 05LA-34090309-EAA-004 | 1.53 | 1.66 | 1.93 | 2.2 | 2.90 |
| Ca, ppm | 05LA-34090309-EAA-004 | 1.17 | 1.05 | 0.83 | 0.61 | 0.04 |

[1] The physical and chemical properties of light crude oil type shale/tight oil present variations even in samples from the same production well.

For purposes of a better understanding, some practical examples of the present invention are described below, without limiting its scope.

BRIEF DESCRIPTION OF THE DRAWINGS OF THE INVENTION

The description of the invention refers to the following figures.

EXAMPLES

Example 1

Figure 1:
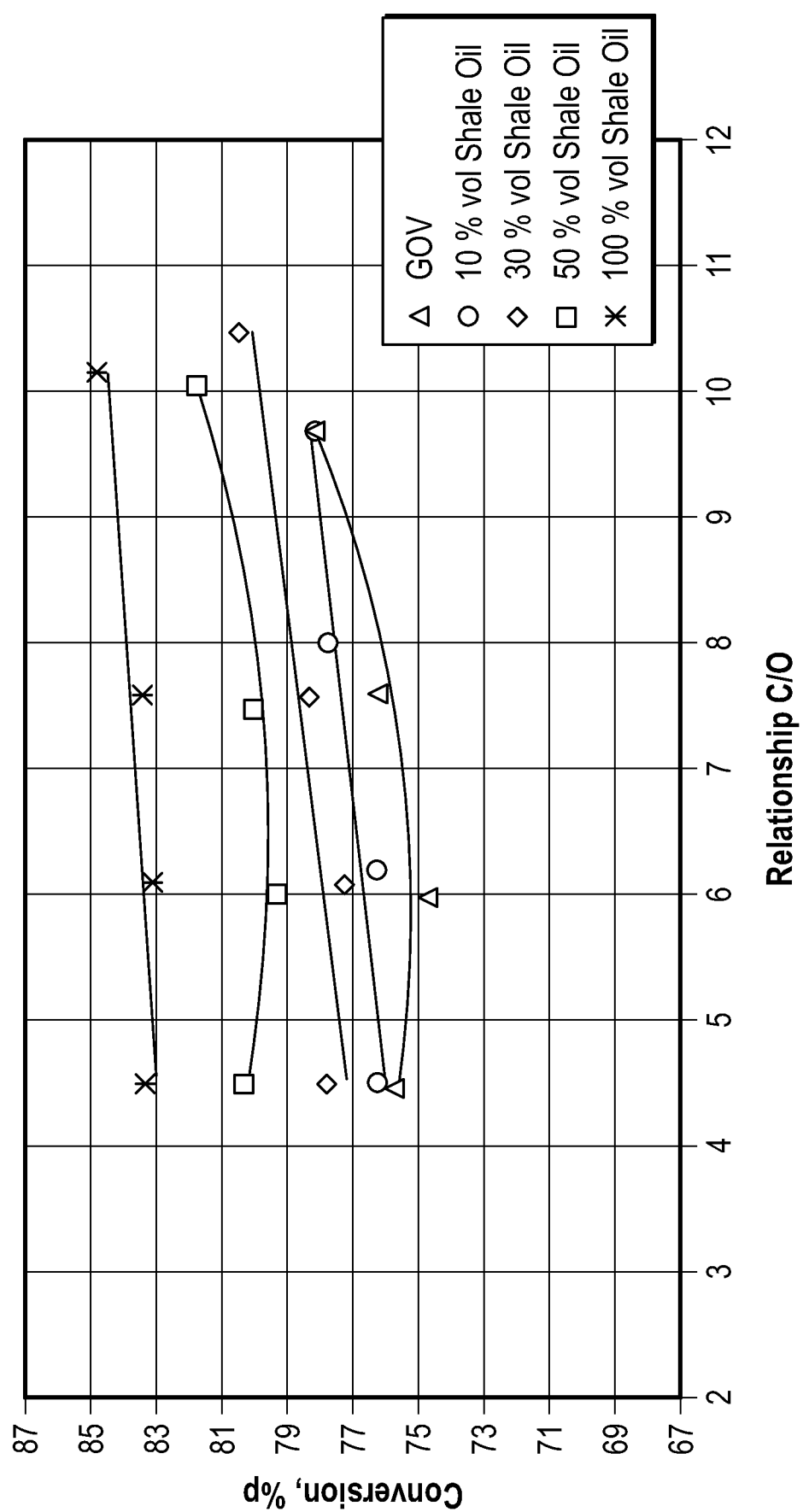
FIG. 1 shows the total conversion as a function of the C/O ratio for catalyst CAT-1, at different ratios of vacuum gas oil/shale oil blends in the feed stream to the FCC catalytic cracking reactor.

A catalyst (designated CAT-1) was prepared using 38% of an Ultrastable Y Faujasite Zeolite (USY) containing from 8 to 8.5% by weight of rare earth oxide ($RE_2O_3$) and maximum 1.2% by weight of $Na_2O$. Catalyst CAT-1 also contains 2.0% by weight of ZSM-5 zeolite. As a binder, 15% by weight of alumina from boehmite, formic acid and water were used; the aforementioned boehmite was obtained according to the method described in the Mexican patent MX 245842. In the preparation, 10% by weight of silicon oxide from colloidal silica AS-40 and kaolin were also used. With these materials a suspension with a 30% solids content was calculated.

In a container containing distilled water, each component was added and mixed at a stirring speed of 1000-4000 rpm for 15 minutes until all the components were integrated and a complete homogenization was achieved in the mixture. The material obtained was dried at a temperature between 50-200° C., preferably between 110-180° C. for 6 to 8 hours.

The paste obtained by the way above indicated, was fed to a stainless steel hand extruder in order to form extrudates. The extrudates were dried for 4 hours at 100-120° C., then calcined for 3 hours at 600° C., and finally milled to have a particle size between 74 and 250 microns, using 60 and 200 mesh sieves.

Example 2

For the catalyst (named CAT-2) a composition of 35% of Ultrastable Y (USY) Faujasite zeolite was considered, containing 8 to 8.5% by weight of rare earth oxide ($RE_2O_3$) and maximum 1.2% by weight of $Na_2O$. Catalyst also contains 2.0 wt % zeolite ZSM-5. As a binder, 1.5% by weight of an alumina from aluminum chlorohydrate, 13.5% by weight of alumina from boehmite, formic acid and water were used; the aforementioned boehmite was obtained according to the method described in the Mexican patent registration MX 245842. The catalyst CAT-2 also contains 10% by weight of silicon oxide from colloidal silica AS-40 and kaolin. With these materials and conditions, a suspension with 30% solids was calculated. This catalyst was prepared and heat-treated following the protocols described in Example 1.

Example 3

The catalyst CAT-1 described in example 1 was deactivated at a temperature of 816° C. for 5 hours within an ambient of 100% water vapor, according to the following procedure:

The catalyst is introduced into a quartz tubular reactor provided with a porous plate of the same material. An upflow nitrogen stream is connected. The flow of nitrogen gas is set at a rate of 100 ml/min and heating is started from room temperature to 816° C., at a heating rate of 3-5° C./min. Upon reaching the temperature of 816° C., the nitrogen flow is slowly closed and a 100% steam is introduced. These conditions of steam and temperature are maintained for 5 hours. At the end of the period, the steam flow is suspended, changed for nitrogen and cooled.

Example 4

Catalyst CAT-2 was hydrothermally treated at 860° C. for 5 hours with 100% steam under the same deactivation protocol described in Example 3. Table 2 shows the physical properties of the catalysts before and after the deactivation protocol with steam. The surface area reported in this document was measured using the Nitrogen desorption method in an ASAP-2405 Surface Area Analyzer of Micromeritics. The Surface Area was determined according to ASTM D-4222-03 (R2008) method. The Micropore Volume and the Zeolite Area were determined the ASTM D-4365-95 (R-2008) method. The unit cell size in zeolite was determined using X-ray diffraction (XRD) by comparing each catalyst with a silicon reference material based on IMP 05LA-34080109-AAEC-MP-01 method (subsection F).

TABLE 2

Physical properties of the catalysts before and after deactivation by steam.

| Physical properties | CAT-1 | CAT-2 |
|---|---|---|
| Surface Area, $m^2/g$ | 413 | 360 |
| Zeolite area, $m^2/g$ | 338 | 292 |
| Matrix Area, $m^2/g$ | 75 | 67 |
| Pore Volume, $cm^3/g$ | 0.30872 | 0.283 |
| Unit Cell Size (UCS), Å | 24.579 | 24.563 |
| CATALYST DEACTIVATED BY STEAM | | |
| Deactivation temperature, ° C. | 816 | 860 |
| Surface Area, $m^2/g$ | 255 | 175 |
| Zeolite area, $m^2/g$ | 203 | 122 |
| Matrix Area, $m^2/g$ | 52 | 53 |
| Unit Cell Size (UCS), Å | 24.280 | 24.223 |
| Rate of remaining total area | 62% | 49% |
| Rate of remaining zeolite area | 60% | 42% |
| Rate of remaining Matrix Area | 70% | 79% |

Example 5

The catalytic cracking catalyst named CAT-1 is introduced into a suspended and confined bed reactor by using feedstock 1 comprising vacuum gas oil (100% volume) in order to have a comparative baseline to analyze the own catalyst performance when processing unconventional light crude oil type shale/tight oil and blends of vacuum gas oil with shale/tight oil.

Table 3 shows the catalyst CAT-1 performance as a function of the catalyst/oil ratio. The catalyst/oil ratios performed were of 4.5, 6, 7.5 and 10% weight/weight. Dry gas, LP gas, gasoline, LCO, HCO, coke and total feed conversion, expressed in % by weight of product yields are shown. The effect of the catalyst/oil ratio for 100% volume of vacuum gas oil, was emphasized. Using the catalyst CAT-1, the gasoline yield obtained was from 45.8 to 46.6% by weight, the conversion was from 74.7 to 78.6% by weight and the coke selectivity form 6.8 to 9% by weight. These results were obtained carrying out the evaluation procedure described in the Detailed Description of the Invention Section above and using feedstocks with properties shown in Table 1.

TABLE 3

Reaction products distribution for catalyst CAT-1 when evaluated in a suspended bed reactor using vacuum gas oil feedstock 1 (100% volume), as a function of the catalyst/oil ratio.

| | Catalyst/Oil Ratio | | | |
|---|---|---|---|---|
| | 4.5 | 6 | 7.5 | 10 |
| Dry Gas, % by weight | 2.7 | 2.4 | 2.5 | 2.7 |
| LP Gas, % by weight | 19.7 | 18.6 | 19.0 | 20.0 |
| Gasoline, % by weight | 45.8 | 46.4 | 46.6 | 46.6 |
| LCO, % by weight | 15.9 | 16.1 | 15.3 | 13.8 |
| HCO, % by weight | 8.2 | 9.0 | 8.3 | 7.5 |
| Coke, % by weight | 7.0 | 6.8 | 7.7 | 9.0 |
| Conversion, % by weight | 75.7 | 74.7 | 76.2 | 78.6 |

Example 6

CAT-1 catalytic disintegration catalyst is introduced into an ebullient bed reactor, with feedstock 2 comprising the blend of 90% volume of vacuum gas oil (VGO)+10% volume of domestic light shale/tight oil, with the properties presented in Table 1. The CAT-1 catalyst showed gasoline yield values from 46.2 to 46.8% by weight, with total feed conversion values of 76.3 to 78.5, % by weight, and coke selectivity of 6.8 to 8.7% b weight, these results are shown in Table 4.

TABLE 4

Reaction Products distribution for the catalyst CAT-1 in an ebullient bed reactor as a function of the ratio catalyst/oil, using feedstock 2 consisting of vacuum gas oil (90% by volume) + crude shale/tight oil (10% by volume).

| | Catalyst/Oil Ratio | | | |
|---|---|---|---|---|
| | 4.5 | 6 | 7.5 | 10 |
| Dry Gas, % by weight | 2.8 | 2.6 | 2.8 | 2.8 |
| LP Gas, % by weight | 20.4 | 19.6 | 20.3 | 20.6 |
| Gasoline, % weight | 46.5 | 46.8 | 46.5 | 46.2 |
| LCO, % by weight | 15.6 | 15.3 | 14.4 | 14.3 |
| HCO, % by weight | 8.0 | 8.3 | 7.6 | 7.1 |
| Coke, % by weight | 6.8 | 6.7 | 7.8 | 8.7 |
| Conversion, % by weight | 76.2 | 76.3 | 77.8 | 78.5 |

Example 7

The catalytic cracking catalyst CAT-1 is introduced into an ebullient bed reactor and evaluated using feedstock 3 comprising the blend of 70% volume of vacuum gas oil (VGO)+30% volume of light crude oil type domestic Shale Oil, with the properties presented in Table 1. The catalyst Cat-1 showed gasoline yield values from 46.6 to 48% by weight, total conversion of feed number 3 from 77.3 to 80.4, % by weight and selectivity to coke from 6.5 to 8.8% by weight. These results are shown in Table 5.

TABLE 5

Reaction Products distribution for CAT-1 in an ebullient bed reactor with feedstock 3 consisting of vacuum gas oil (70% by volume) + 30% by volume of shale/ tight oil, as a function of the catalyst/ratio oil.

| | Catalyst/Oil Ratio | | | |
|---|---|---|---|---|
| | 4.5 | 6 | 7.5 | 10 |
| Dry Gas, % by weight | 2.8 | 2.6 | 2.7 | 2.9 |
| LP Gas, % by weight | 21.0 | 19.6 | 20.5 | 22.0 |
| Gasoline, % by weight | 46.9 | 48.0 | 47.3 | 46.6 |
| LCO, % by weight | 15.1 | 15.1 | 14.5 | 13.3 |
| HCO, % by weight | 6.9 | 7.4 | 7.1 | 6.1 |
| Coke, % by weight | 6.6 | 6.5 | 7.3 | 8.8 |
| Conversion, % by weight | 77.8 | 77.3 | 78.3 | 80.4 |

Example 8

Catalyst testing of catalyst CAT-1 was carried out using feedstock 4 consisting of a blend of 50% by volume of vacuum gas oil+50% by volume of shale/tight oil, with properties presented in Table 1. Catalytic performance of catalyst CAT-1 in the catalytic cracking reaction showed gasoline yield values from 48.3 to 49.5% by weight, with total feedstock conversion from 79.3 to 81.8% by weight and selectivity to coke from 6.1 to 7.9% by weight, these Results are shown in Table 6.

TABLE 6

Reaction Products distribution for CAT-1 catalyst in an ebullient bed reactor with feedstock 4 consisting of vacuum gas oil (50% by volume) + 50% by volume of light shale/tight oil, as a function of the catalyst/oil ratio

| | Catalyst/Oil Ratio | | | |
|---|---|---|---|---|
| | 4.5 | 6 | 7.5 | 10 |
| Dry gas, % by weight | 2.9 | 2.6 | 2.6 | 2.8 |
| LPG, % by weight | 22.3 | 20.6 | 21.1 | 22.7 |
| Gasoline, % by weight | 48.3 | 49.5 | 48.9 | 48.2 |
| LCO, % by weight | 14.0 | 14.4 | 14.0 | 12.9 |
| HCO, % by weight | 5.6 | 6.1 | 5.8 | 5.1 |
| Coke, % by weight | 6.3 | 6.1 | 6.8 | 7.9 |
| Conversion, % by weight | 80.3 | 79.3 | 80.0 | 81.8 |

Example 9

Catalyst testing of catalyst CAT-1 was carried out using feedstock 5 consisting of 100% by volume of shale/tight oil, with properties presented in Table 1. Catalytic performance of catalyst CAT-1 in the catalytic cracking reaction showed gasoline yield values from 48.8 to 51% by weight, with total feedstock conversion from 79.3 to 81.8% by weight and selectivity to coke from 6.4 to 8.0% by weight. The products distribution is showed in Table 7. The gasoline yield, LPG yield and total conversion are notably increased compared to Example 5 results.

TABLE 7

Reaction Products distribution for catalyst CAT-1 in an ebullient bed reactor with feedstock 5 consisting of 100% by volume of light shale/tight oil, as a function of catalyst/oil ratio.

| | Catalyst/Oil Ratio | | | |
|---|---|---|---|---|
| | 4.5 | 6 | 7.5 | 10 |
| Dry gas, % by weight | 2.9 | 2.6 | 2.6 | 2.8 |
| LPG, % by weight | 24.7 | 22.6 | 23.1 | 25.0 |
| Gasoline, % by weight | 49.2 | 51.0 | 50.1 | 48.8 |
| LCO, % by weight | 12.4 | 12.6 | 12.5 | 11.3 |
| HCO, % by weight | 4.0 | 4.1 | 4.0 | 3.7 |
| Coke, % by weight | 6.4 | 6.4 | 7.0 | 8.0 |
| Conversion, % by weight | 83.4 | 83.1 | 83.3 | 84.8 |

Figure 2:
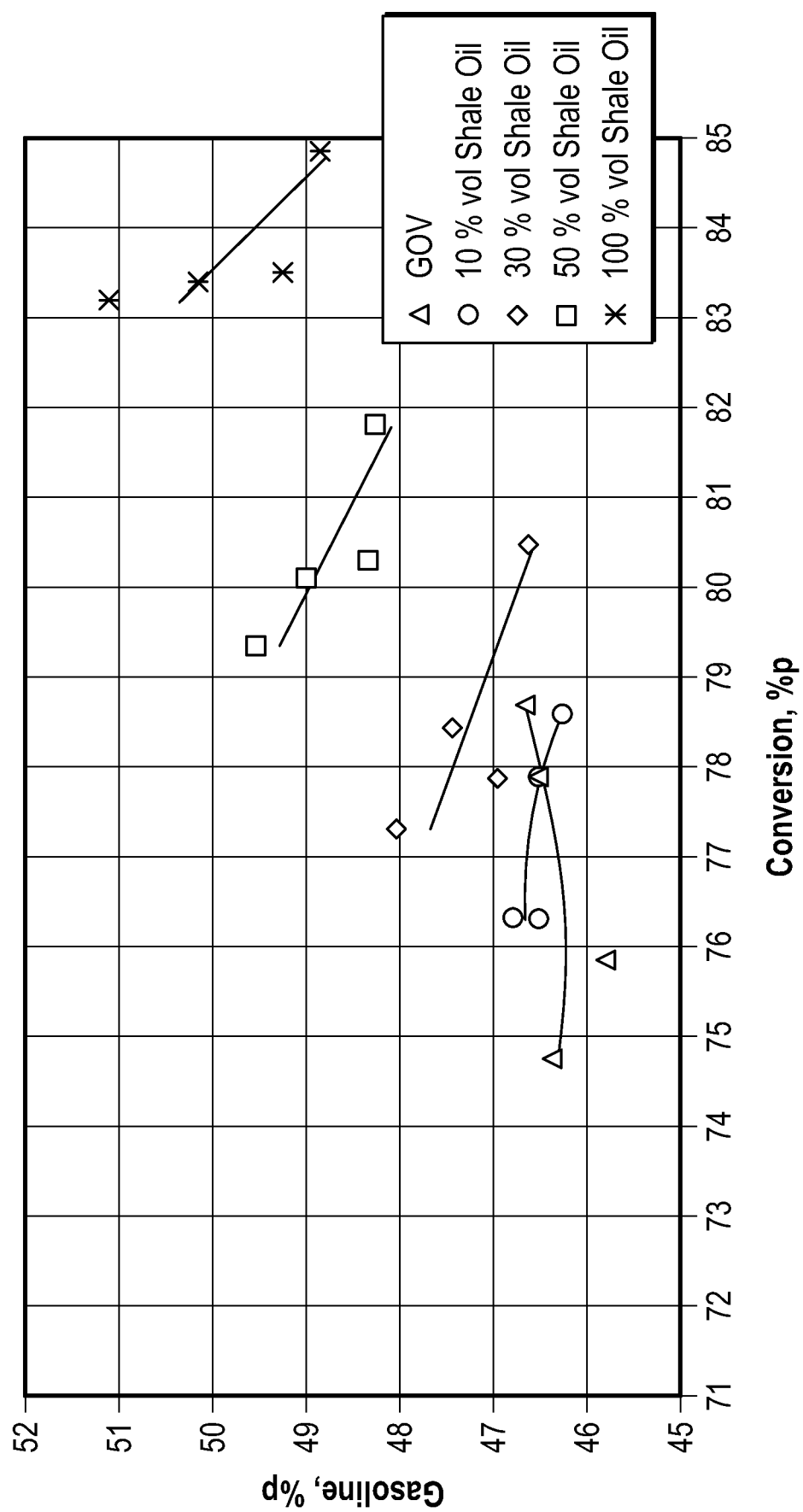
FIG. 2 shows the gasoline yield as a function of the total conversion for catalyst CAT-1, at different ratio of vacuum gas oil/shale oil blends in the feed stream to the FCC catalytic cracking reactor.
Figure 3:
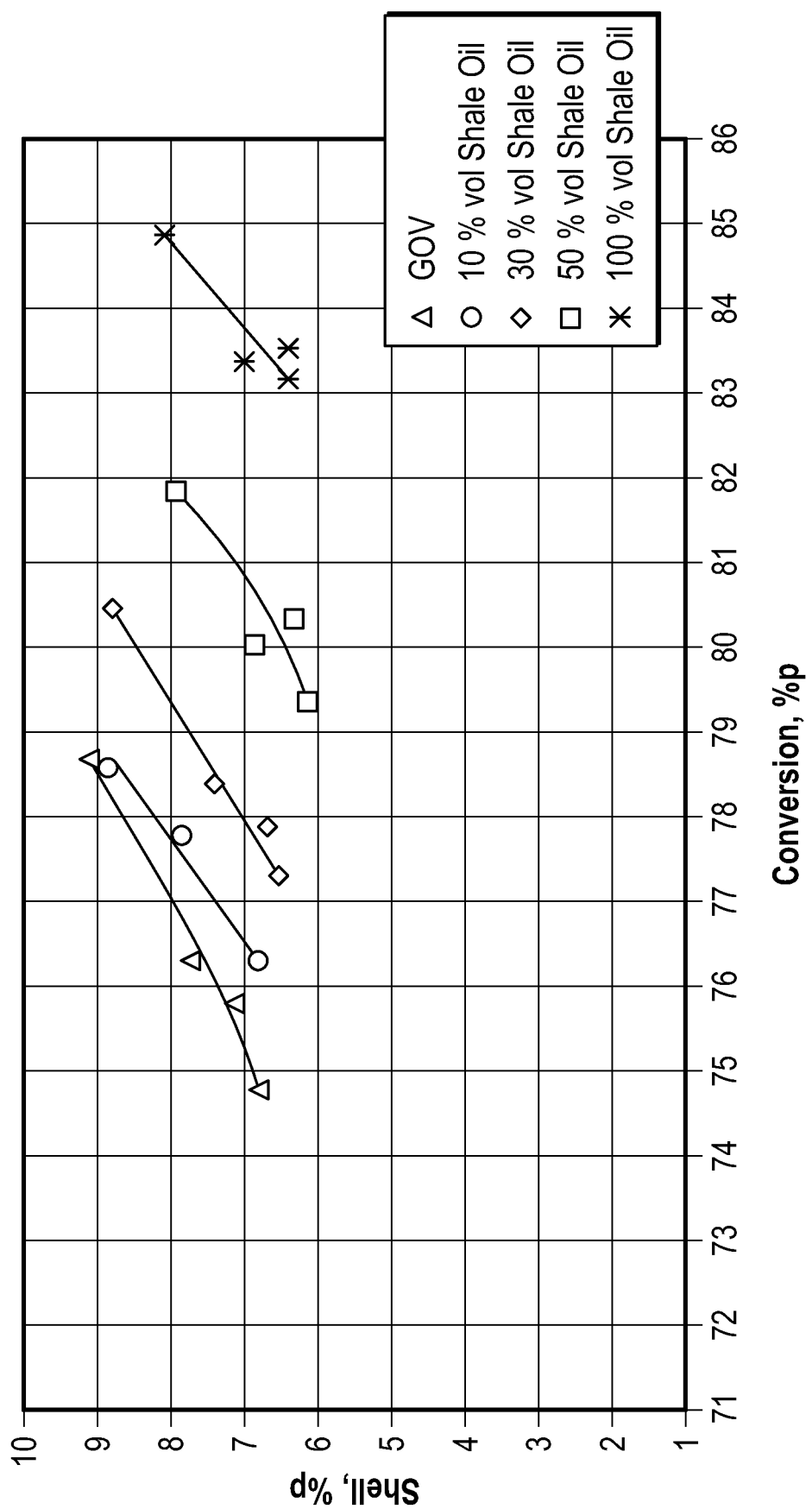
FIG. 3 shows the coke yield as a function of the total conversion for catalyst CAT-1, at different ratio of vacuum gas oil/shale oil blend in the feed stream to the FCC catalytic cracking reactor.

According to the examples 5 to 9, FIGS. 1, 2 and 3 show representative results of the behavior of catalyst CAT-1 activity for the total conversion of feedstock and the gasoline and coke yield. FIG. 1 shows the conversion as a function of the catalyst/oil ratio (R=C/O), when the feedstocks 1 to 5 are used in the catalytic cracking reactor.

FIG. 2 shows the gasoline yield as a function of the total conversion of feedstock in % by weight, when feedstocks 1 to 5 of Table 1 are used in the catalytic cracking reactor with catalyst CAT-1.

FIG. 3 shows the coke production as a function of the total feedstock conversion (% by weight), when feedstocks 1 to 5 of table 1 are used in the catalytic cracking reactor with catalyst CAT-1. At constant coke content (7% by weight) in the catalyst when VGO vacuum gas oil is processed, the conversion is from 75.8% by weight; when feedstock processed is a blend consisting of 50% by volume of VOG+ 50% by volume of shale/tight oil, the conversion increases 5% by weight, up to 80.8% by weight. If 100% by volume of unconventional crude oil is processed, the total conversion increases 8% by weight.

Example 10

The catalytic cracking catalyst CAT-2 was evaluated in the fluidized bed reactor with feedstock 1 consisting of 100% volume vacuum gas oil VGO, following the evaluation procedure described above. The feedstock properties are shown in Table 1. As a result of the microactivity conversion, gasoline yield values are between the range of 45.3 to 45.9% by weight, total conversion is in the range of 71 to 74,% by weight, and selectivity to coke is in the range from 5.6 to 7.4% weight.

Table 8 shows the reaction products distribution for the catalyst CAT-2, the dry gas, LP gas, gasoline, LCO, HCO and coke yields, as well as microactivity conversion expressed in % by weight, based on the catalyst/oil ratio for a feedstock consisting of vacuum gas oil at 100% volume.

TABLE 8

Reaction Products distribution for catalyst CAT-2 with a feedstock consisting of 100% by volume of vacuum gasoil VGO, as a function of the catalyst/oil ratio.

| | Catalyst/Oil Ratio | | | |
|---|---|---|---|---|
| | 4.5 | 6 | 7.5 | 10 |
| Dry gas, % by weight | 2.1 | 2.0 | 2.1 | 2.2 |
| LPG, % by weight | 17.8 | 16.9 | 17.8 | 18.3 |
| Gasoline, % by weight | 45.3 | 45.7 | 45.9 | 45.7 |
| LCO, % by weight | 18.0 | 17.9 | 17.0 | 16.6 |
| HCO, % by weight | 9.9 | 11.3 | 10.0 | 9.3 |
| Coke, % by weight | 6.2 | 5.6 | 6.6 | 7.4 |
| Conversion, % by weight | 71.9 | 72.3 | 72.9 | 74.0 |

Example 11

The microactivity of the catalytic cracking catalyst CAT-2 was evaluated in an ebullient bed reactor with feedstock 2 consisting of a blend 90% by volume of vacuum gas oil VGO+10% by volume of shale/tight oil, with properties presented in Table 1. As a result of the catalyst testing, gasoline yield values on the range from 46.3 to 46.6% by weight, total conversion from 72.4 to 73, % by weight and selectivity to coke from 5.9 to 6.7% by weight, were obtained.

Table 9 shows the performance of the catalyst CAT-2 in terms of yield to dry gas, LP gas, gasoline, LCO, HCO, coke and total feedstock conversion in % by weight, as a function of the ratio of catalyst/oil for said feedstock.

TABLE 9

Reaction Products distribution for catalyst CAT-2 in an ebullient bed reactor with feedstock 2 consisting of a blend 90% by volume of vacuum gasoil VGO + 10% by volume of shale/tight oil, as a function of the catalyst/oil ratio.

| | Catalyst/Oil Ratio | | | |
|---|---|---|---|---|
| | 4.5 | 6 | 7.5 | 10 |
| Dry gas, % by weight | 2.1 | 2.0 | 2.1 | 2.2 |
| LPG, % by weight | 17.4 | 16.2 | 16.8 | 17.2 |
| Gasoline, % by weight | 46.3 | 46.5 | 46.6 | 46.6 |
| LCO, % by weight | 18.0 | 18.3 | 18.0 | 17.8 |
| HCO, % by weight | 9.4 | 10.6 | 9.8 | 9.2 |
| Coke, % by weight | 6.1 | 5.9 | 6.5 | 6.7 |
| Conversion, % by weight | 72.4 | 72.4 | 72.5 | 73.0 |

Example 12

The catalytic activity of the heterogeneous catalyst CAT-2 was evaluated using feedstock 3 with the highest content of shale/tight oil, consisting of a blend 70% by volume of vacuum gas oil VGO+30% by volume of shale/tight oil, with the properties shown in Table 1. The CAT-2 catalyst presented gasoline yield values in a range from 46.6 to 47.5% by weight, total conversion from 72.3 to 75.2% by weight, and coke selectivity from 5.2 to 7.0% by weight.

Table 10 shows the product distribution for the catalyst CAT-2, dry gas yield, LP gas yield, gasoline yield, LCO, HCO and coke yields, as well as total conversion, expressed in % by weight, as a function of the catalyst/oil ratio

TABLE 10

Reaction Products distribution for catalyst CAT-2 in an ebullient bed reactor with feedstock consisting of a blend 70% by volume of vacuum gasoil VGO + 30% by volume of shale/tight oil, as a function of the catalyst/oil ratio.

| | Catalyst/Oil Ratio | | | |
|---|---|---|---|---|
| | 4.5 | 6 | 7.5 | 10 |
| Dry gas, % by weight | 2.1 | 2.0 | 2.1 | 2.3 |
| LPG, % by weight | 17.2 | 16.5 | 17.3 | 18.2 |
| Gasoline, % by weight | 46.6 | 47.3 | 47.4 | 47.5 |
| LCO, % by weight | 18.9 | 18.9 | 17.8 | 16.8 |
| HCO, % by weight | 8.7 | 9.5 | 9.0 | 7.9 |
| Coke, % by weight | 6.0 | 5.2 | 5.8 | 7.0 |
| Conversion, % by weight | 72.3 | 72.6 | 73.0 | 75.2 |

Example 13

The catalytic performance for catalyst CAT-2 was carried out used feedstock 4, consisting of a blend of 50% by volume of vacuum gas oil VGO+50% volume of shale/tight oil, with the properties shown in Table 1.

The evaluation of the catalytic cracking reaction showed gasoline yield values in a range of 47.8 to 48.3% by weight, total conversion from 73.1 to 75.7% by weight, and coke selectivity from 5.0 to 6.2% by weight, these results are shown in Table 11

TABLE 11

Reaction products distribution for catalyst CAT-2 in an ebullient bed reactor with feedstock 4 consisting of a blend 50% by volume of vacuum gasoil VGO + 50% by volume of shale/tight oil, as a function of the catalyst/oil ratio.

| | Catalyst/Oil Ratio | | | |
|---|---|---|---|---|
| | 4.5 | 6 | 7.5 | 10 |
| Dry gas, % by weight | 2.1 | 1.9 | 2.1 | 2.2 |
| LPG, % by weight | 17.6 | 16.6 | 17.5 | 18.1 |
| Gasoline, % by weight | 47.8 | 48.1 | 48.2 | 48.3 |
| LCO, % by weight | 18.9 | 19.3 | 18.7 | 17.6 |
| HCO, % by weight | 8.1 | 9.0 | 8.5 | 7.9 |
| Coke, % by weight | 5.5 | 5.0 | 5.4 | 6.2 |
| Conversion, % by weight | 74.0 | 73.1 | 73.5 | 75.7 |

Example 14

The catalyst CAT-2 is evaluated using feedstock 5, which consists of 100% by volume of shale/tight oil, whose properties are shown in Table 1. The reaction conditions to which the catalyst was subjected, allowed obtaining gasoline yield values in a range of 47.8 to 49% by weight, total conversion from 74.8 to 76.6, and coke selectivity in a range of 5.0 6.4% by weight. These results are shown in Table 12

TABLE 12

Reaction Products distribution for catalyst CAT-2 in an ebullient bed reactor with feedstock 5 consisting of 100% by volume of shale/tight oil, as a function of the catalyst/oil ratio.

|  | Catalyst/Oil Ratio | | | |
| --- | --- | --- | --- | --- |
|  | 4.5 | 6 | 7.5 | 10 |
| Dry gas, % by weight | 2.1 | 2.0 | 2.0 | 2.1 |
| LPG, % by weight | 19.9 | 18.7 | 19.5 | 20.1 |
| Gasoline, % by weight | 48.2 | 49.0 | 48.7 | 47.8 |
| LCO, % by weight | 18.7 | 18.6 | 18.4 | 18.2 |
| HCO, % by weight | 5.8 | 6.4 | 5.6 | 5.1 |
| Coke, % by weight | 5.0 | 5.1 | 5.6 | 6.4 |
| Conversion, % by weight | 75.4 | 74.8 | 75.9 | 76.6 |

Figure 4:
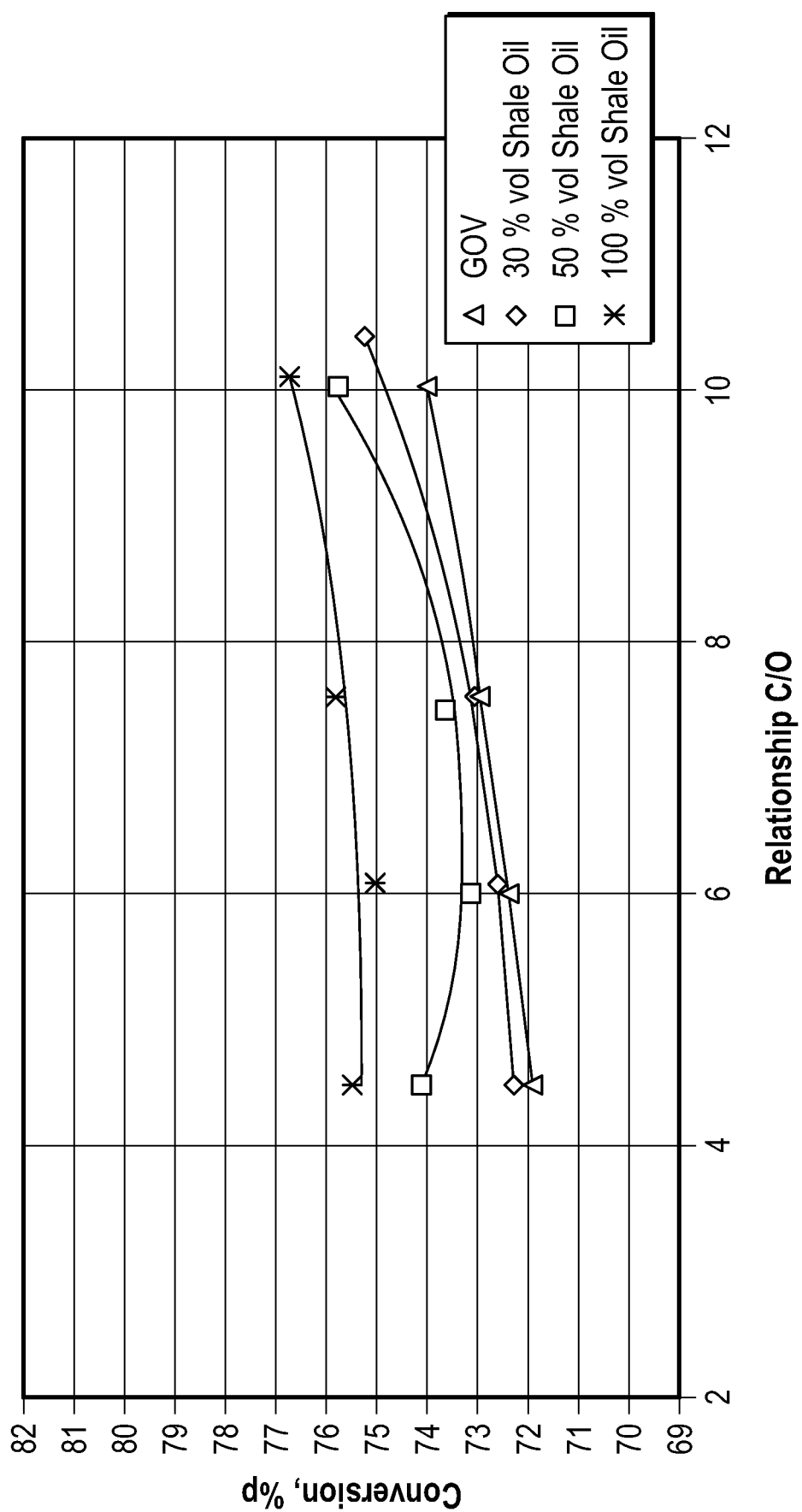
FIG. 4 shows the total conversion as a function of the C/O ratio for the catalyst CAT-2, with different ratio of shale/tight oil blend in the feed stream to the FCC micro reactor.
Figure 5:
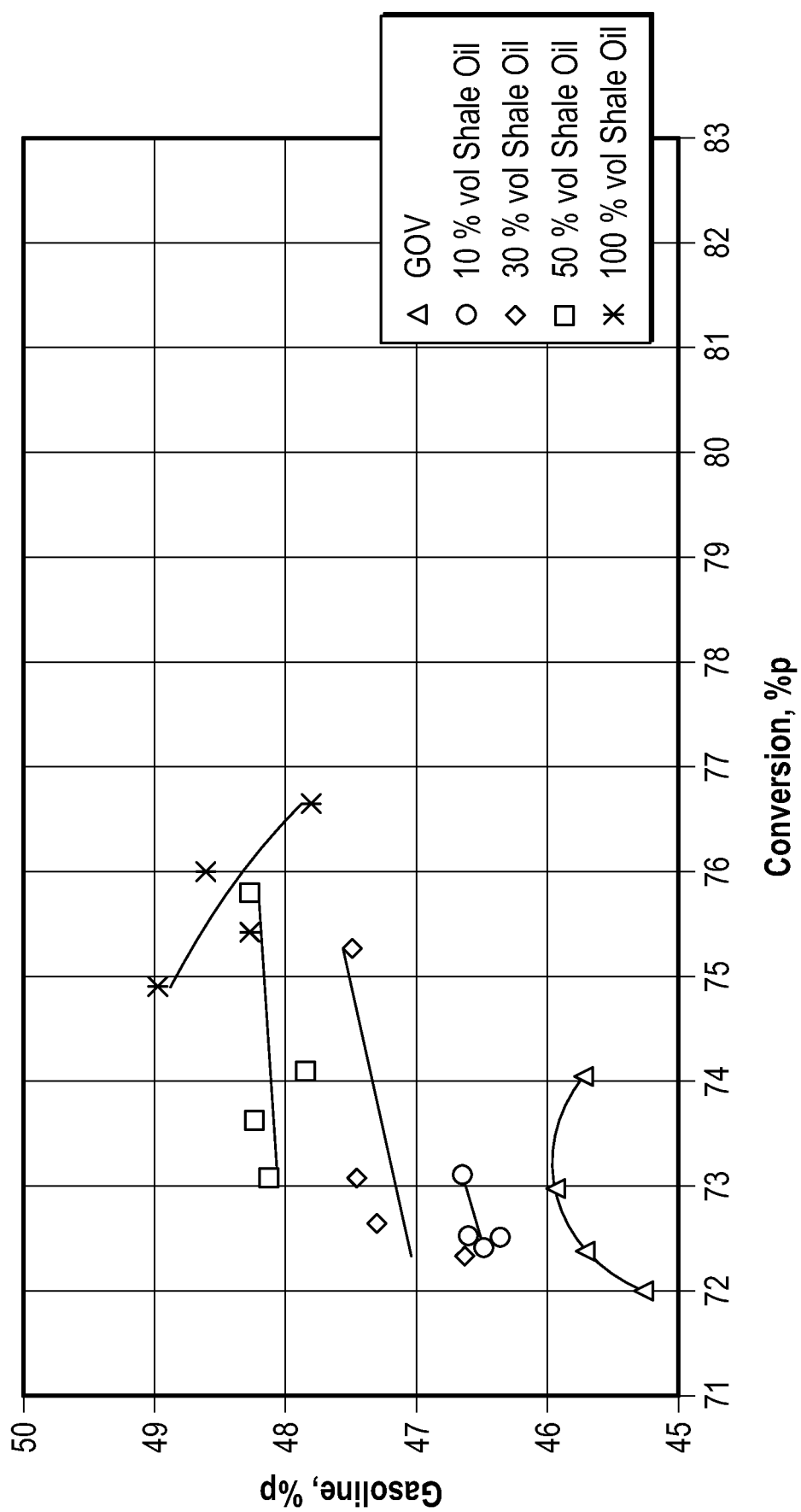
FIG. 5 shows the gasoline yield as a function of the total conversion for the catalyst CAT-2, at different ratio of shale/tight oil blend in the feed stream to the FCC micro reactor.
Figure 6:
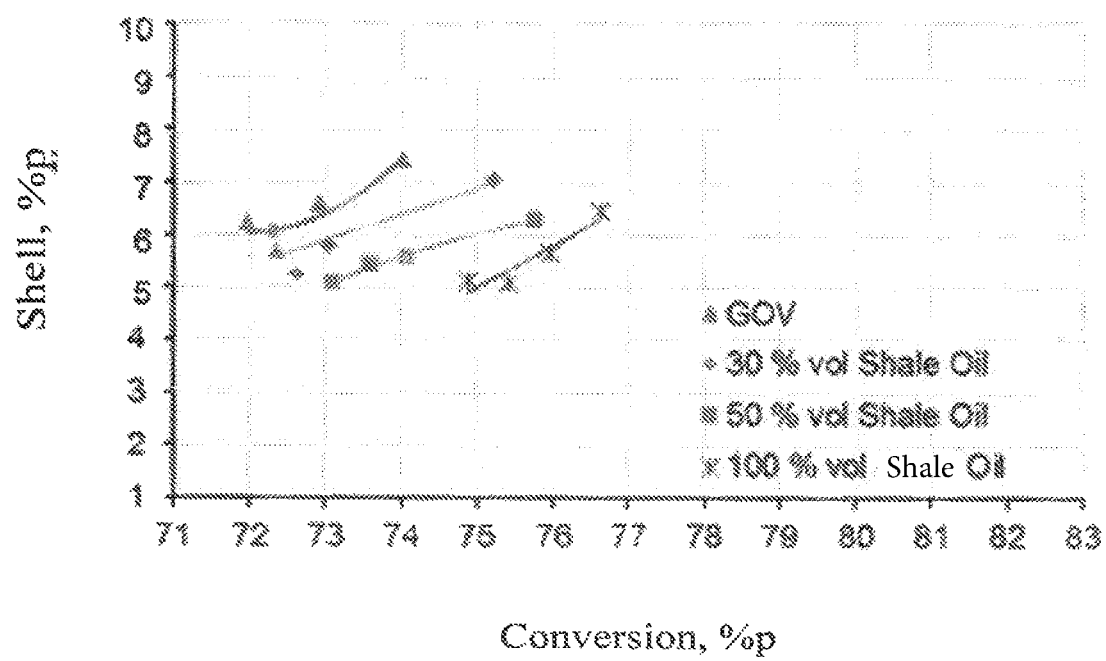
FIG. 6 shows the coke yield as a function of the total conversion for the catalyst CAT-2, at different shale/tight oil ratio in the feed stream blend to the FCC micro reactor.

For the examples 10 to 14, the representative results of catalyst CAT-2 activity behavior are shown in FIGS. 4 to 6, included feedstock conversion as well as gasoline and coke production.

FIG. 4 shows the total conversion as a function of the catalyst/oil ratio (R=C/O) with values or 4.5, 6, 7.5 and 10, for the different feedstocks (feedstock 1 to 5) shown in table 1, which comprise blends of vacuum gas oil VGO with shale/tight oil in proportions of 0, 30, 50 and 100% by volume.

What is claimed is:

1. A catalytic system, comprising:
a heterogeneous solid acid catalyst based on a formulation with at least one active zeolite comprising Faujasite Y zeolite and a coke selective active matrix;
wherein the active matrix is selected from a group consisting of gamma phase alumina, silica-alumina or silicon oxide, kaolin, aluminum chlorohydrate, or mixtures thereof and avoids the use of phosphate; and
hydrocarbon feedstocks consisting of vacuum gas oil (VGO), conventional vacuum gas oil, hydrotreated vacuum gas oil, unconventional light crude oil, or unconventional light crude oil type shale/tight oil and its blends with conventional vacuum gas oil, in a percentage range of from 0 to 100% by volume of unconventional light crude oil,
wherein the hydrocarbon feedstocks are placed in contact with the heterogeneous solid acid catalyst.

2. A catalytic system, comprising:
a heterogeneous solid acid catalyst based on a formulation with at least one active zeolite comprising Faujasite Y zeolite and a coke selective active matrix;
wherein the active matrix is selected from a group consisting of gamma phase alumina, silica-alumina or silicon oxide, kaolin, aluminum chlorohydrate, or mixtures thereof and avoids the use of phosphate; and
hydrocarbon feedstocks consisting of vacuum gas oil (VGO), conventional vacuum gas oil, hydrotreated vacuum gas oil, unconventional light crude oil, or unconventional light crude oil type shale/tight oil and its blends with conventional vacuum gas oil, in a percentage range of from 0 to 100% by volume of unconventional light crude oil, put in contact with the heterogeneous solid acid catalyst.

3. The catalytic system of claim 2, wherein the active zeolite further comprises a REY zeolite and a ZSM-5 zeolite.

4. The catalytic system of claim 3, further comprising a binder comprising a peptized alumina.

5. The catalytic system of claim 2, wherein the total surface area of catalyst is in the range from 350 $m^2/g$ to 450 $m^2/g$, the zeolite surface area is in the range from 280 $m^2/g$ to 350 $m^2/g$, the matrix area is in the range from 60 $m^2/g$ to 75 $m^2/g$ and the pore volume in the range of from 0.25 $cm^3/g$ to 0.35 $cm^3/g$ obtained by the Nitrogen desorption method.

6. The catalytic system of claim 2, wherein the active zeolite comprising Faujasite Y zeolite further comprising a stabilizing metal selected from a group consisting of lanthanum (La), Cerium (Ce), or its mixtures.

7. The catalytic system of claim 2, wherein the active zeolite comprising Faujasite Y zeolite further comprising a stabilizing metal; wherein the stabilizing metal comprises from 2.5% to 5.1% by weight of the catalyst.

* * * * *